US010331159B2

(12) United States Patent
Kanjavalappil Raveendranath

(10) Patent No.: US 10,331,159 B2
(45) Date of Patent: Jun. 25, 2019

(54) STARTUP CURRENT LIMITERS

(71) Applicant: TEXAS INSTRUMENTS INCORPORATED, Dallas, TX (US)

(72) Inventor: Rejin Kanjavalappil Raveendranath, Thrissur (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/027,542

(22) Filed: Jul. 5, 2018

(65) Prior Publication Data

US 2018/0314286 A1 Nov. 1, 2018

Related U.S. Application Data

(63) Continuation of application No. 15/811,904, filed on Nov. 14, 2017, now abandoned.

(30) Foreign Application Priority Data

Dec. 22, 2016 (IN) ............................. 201641043831

(51) Int. Cl.
*H02M 1/36* (2007.01)
*G05F 5/00* (2006.01)
*H02M 3/157* (2006.01)

(52) U.S. Cl.
CPC ...................................... *G05F 5/00* (2013.01)

(58) Field of Classification Search
CPC .......... H02M 1/32; H02M 1/36; H02M 3/156; H02M 3/157; H02H 9/00; H02H 9/002; H02H 9/02; H02H 9/025; H02H 3/08; H02H 3/087; G05F 1/573; H03K 17/08; H03K 17/082
See application file for complete search history.

(56) References Cited

U.S. PATENT DOCUMENTS

| | | | | |
|---|---|---|---|---|
| 6,385,060 | B1 | 5/2002 | Basso | |
| 8,183,847 | B2 | 5/2012 | Capilla | |
| 8,242,755 | B2 * | 8/2012 | Park ........................ | H02M 1/36 323/222 |
| 8,664,929 | B2 | 3/2014 | Fan | |
| 8,665,010 | B2 | 3/2014 | Lin | |
| 8,829,876 | B2 | 9/2014 | Michishita | |
| 8,970,790 | B2 | 3/2015 | Murakami | |

* cited by examiner

*Primary Examiner* — Gary L Laxton
(74) *Attorney, Agent, or Firm* — Tuenlap Chan; Charles A. Brill; Frank D. Cimino

(57) ABSTRACT

In some embodiments, a startup current limiter comprises a first comparator, a second comparator, on time circuitry coupled to an output of the second comparator, and a first logic structure coupled to the output of the second comparator and an output of the on time circuitry. In some embodiments, the startup current limiter further comprises sequencing logic coupled to an output of the first comparator, a latch coupled to an output of the first comparator at a set terminal of the latch and an output of the second comparator at a reset terminal of the latch, off time circuitry coupled to an output terminal of the latch, a second logic structure coupled to the latch and the off time circuitry, and a gate driver coupled to the second logic structure and an output of the sequencing logic.

16 Claims, 3 Drawing Sheets

STARTUP CURRENT LIMITERS

CROSS-REFERENCE TO RELATED APPLICATIONS

Under 35 U.S.C. § 120, this continuation application claims benefits of and priority to U.S. patent application Ser. No. 15/811,904 (TI-78027), filed on Nov. 14, 2017, which claims priority to Indian Provisional Patent Application No. 201641043831, which was filed Dec. 22, 2016. The entirety of the above referenced applications is hereby incorporated herein by reference.

BACKGROUND

Power converters are electrical components that convert an input voltage to an output voltage that is less than the input voltage (in the case of a buck converter) or greater than the input voltage (in the case of a boost converter). Some converters can produce an output voltage that is either less than or greater than the input voltage (in the case of a buck-boost converter). Power converters produce the output voltage through a series of switching actions and/or charging or discharging of electrical components such as capacitors.

SUMMARY

In some embodiments, a startup current limiter comprises a first comparator, a second comparator, on time circuitry coupled to an output of the second comparator, and a first logic structure coupled to the output of the second comparator and an output of the on time circuitry. In some embodiments, the startup current limiter further comprises sequencing logic coupled to an output of the first comparator, a latch coupled to an output of the first comparator at a set terminal of the latch and an output of the second comparator at a reset terminal of the latch, off time circuitry coupled to an output terminal of the latch, a second logic structure coupled to the latch and the off time circuitry, and a gate driver coupled to the second logic structure and an output of the sequencing logic.

In some embodiments, an apparatus comprises a power stage operable to receive an input signal at a first voltage value and output an output signal at a second voltage value greater than the first voltage value; and a startup current limiter coupled to the power stage. In some embodiments, the startup current limiter comprises a first comparator, a second comparator, on time circuitry coupled to an output of the second comparator, and a first logic structure coupled to the output of the second comparator and an output of the on time circuitry. In some embodiments, the startup current limiter further comprises sequencing logic coupled to an output of the first comparator, a latch coupled to an output of the first comparator at a set terminal of the latch and an output of the first logic structure at a reset terminal of the latch, off time circuitry coupled to an output terminal of the latch, a second logic structure coupled to the latch and the off time circuitry, and a gate driver coupled the power stage. In some embodiments, the gate driver comprises a reference generation circuit. In some embodiments, the reference generation circuit comprises a current mirror, an adjustable current source coupled to an input transistor of the current mirror, a first diode-connected transistor coupled to the input transistor of the current mirror, and a second diode-connected transistor coupled to an output transistor of the current mirror. In some embodiments, the gate driver further comprises a control circuit. In some embodiments, the control circuit comprises a de-multiplexer having a first input coupled to an output of the second logic structure and a second input coupled to an output of the sequencing logic, a first inverter coupled to a first output of the de-multiplexer, a buffer coupled to a second output of the de-multiplexer, and a second inverter coupled to an input of the control circuit. In some embodiments, the control circuit further comprises a first transistor having a first gate terminal coupled to an output of the first inverter, a second transistor having a second gate terminal coupled to an output of the buffer, and a third transistor having a third gate terminal coupled to an output of the second inverter.

In some embodiments, a method comprises powering-on a power converter power stage coupled to a startup current limiter. The method further includes performing, by the startup current limiter, comparisons based on electrical characteristics of the power stage. The method also includes determining an off time for a control signal to be generated by the startup current limiter for controlling the power stage. The method additionally includes generating, at least partially according to the off time for the control signal and an output of the power stage, the control signal by the startup current limiter. The method also includes controlling the output of the power stage using the control signal.

BRIEF DESCRIPTION OF THE DRAWINGS

For a detailed description of various examples, reference will now be made to the accompanying drawings in which.

DETAILED DESCRIPTION

Figure 1:
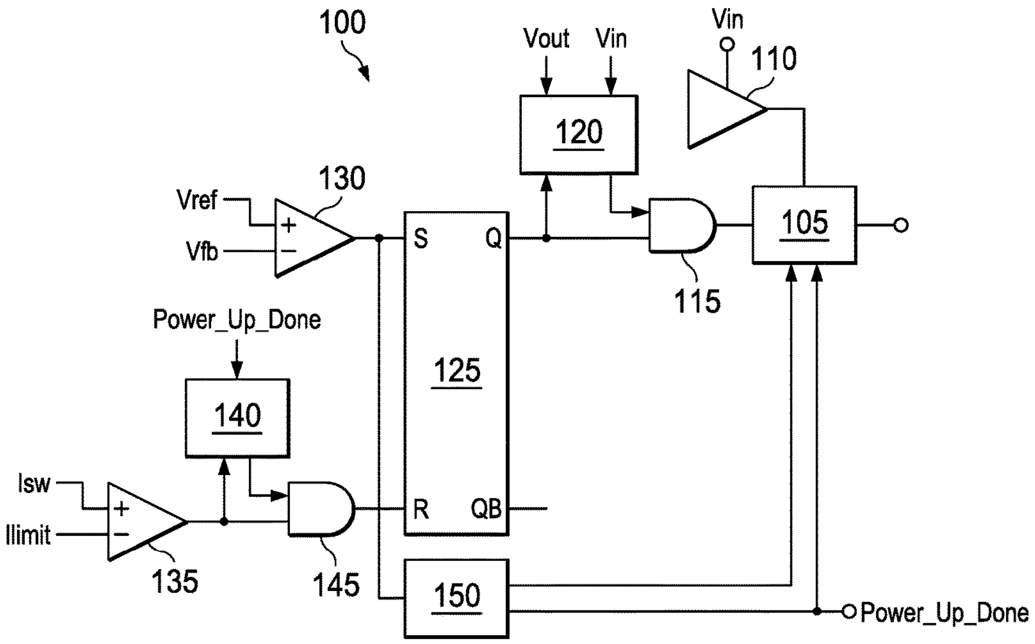
FIG. 1 is a schematic diagram of an illustrative startup current limiter in accordance with various embodiments.

A conventional hybrid boost converter holds a drain terminal of a control switch (e.g., a metal oxide semiconductor field effect transistor (MOSFET)) of the hybrid boost converter at an input voltage of the hybrid boost converter. Similarly, a capacitor (sometimes referred to as a fly capacitor) is also held at the input voltage of the hybrid boost converter and is coupled to the drain terminal of the control switch. When the control switch is controlled to turn on (e.g., receives an input voltage sufficient to cause the control switch to conduct current between its drain and source terminals), the capacitor coupled to the control switch may attempt to discharge through the control switch. For example, the capacitor may attempt to discharge through the control switch as a result of a comparatively low resistance existing between the drain and source terminals of the control switch (e.g., such as a resistance of approximately 1 ohm). When the hybrid boost converter operates at high voltage and/or current levels, this sudden attempted discharge by the capacitor through the control switch may cause a sudden and comparatively large inrush current to flow to, or through, the control switch. This sudden inrush current may irreparably degrade, damage, and/or destroy the control switch and/or couplings between the capacitor and the control switch (e.g., metal traces of a minted circuit board, metal routing on a silicon die or electronic chip).

Disclosed herein are embodiments that limit inrush current for a hybrid boost converter and/or other electrical components or devices. The inrush current limiting may be achieved, for example, by way of a startup current limiter. While discussed herein with reference to a hybrid boost converter, the disclosed embodiments may be equally applicable to other devices, such as other types of boost converters, power converters, or other electronic devices that may be unrelated to power conversion. In an embodiment, the startup current limiter generates a control signal that may be operable to limit inrush current of a switch of the hybrid boost converter. For example, the startup current limiter may generate and provide to the switch of the hybrid boost converter a control signal at varying voltage levels. In this embodiment, when the switch of the hybrid boost converter is a transistor, for example, such as a MOSFET and the control signal has a low voltage level, the MOSFET may operate as a current source rather than a switch. The MOSFET may operate with a current waveform approximating a square wave that may include current components from other portions of the hybrid boost converter (e.g., such as an inductor and a capacitor of the hybrid boost converter). The voltage level of the control signal may then be increased until the MOSFET is pushed into a linear range of operation and operates as a switch rather than as the current source. In some embodiments, the voltage level of the control signal may be limited and slowly increased during a power-up phase of the hybrid boost converter until the MOSFET operates as the switch. In some embodiments, a reference current used in generating the control signal may be controlled and/or varied to provide for a gradual transition of the MOSFET from operation as the current source to operation as the switch.

In an embodiment, the control signal may be a periodic signal that has an on time (e.g., a time at which the periodic signal is high) and an off time a time at which the periodic signal is low). The startup current limiter may scale the off time based, at least partially, on an input voltage and an output voltage of the hybrid boost converter, for example, to limit and/or prevent a potentially unwanted buildup of current in the hybrid boost converter. The potentially unwanted buildup of current may be, for example, an inductor current in the hybrid boost converter that may at least partially contribute to the potential for a large inrush current to the MOSFET.

Referring now to FIG. 1, a schematic diagram of an illustrative startup current limiter 100 in accordance with various embodiments is shown. The startup current limiter 100 may be, for example, coupled to a hybrid boost converter (not shown) by way of couplings such as wires, metal traces on a printed circuit board, metal routing on a silicon substrate, or any other suitable form of conductive coupling. The startup current limiter 100 may be implemented, for example, as a standalone device (e.g., implemented on its own substrate, enclosed within its own electrical chip package, etc.) or may be implemented with other devices, such as the hybrid boost converter (e.g., on a substrate including other devices, enclosed in an electrical chip package that includes other devices, etc.).

In an embodiment, the startup current limiter 100 comprises a gate driver 105, a voltage regulator 110, an AND gate 115, off time circuitry 120, memory cell 125, comparator 130, a comparator 135, on time circuitry 140, an AND gate 145, and sequencing logic 150. The comparator 130 may be coupled to a data input of the memory cell 125 and an input of the sequencing logic 150. The comparator 135 may be coupled to an input of the on time circuitry 140 and a first input of the AND gate 145. The on time circuitry 140 may be coupled at an output to a second input of the AND gate 145. The AND gate 145 may be coupled at an output to a reset input of the memory cell 125. The memory cell 125 may be coupled at an output to an input of the off time circuitry 120 and a first input of the AND gate 115. The off time circuitry 120 may be coupled at an output to a second input of the AND gate 115. The AND gate 115 may be coupled at an output to the gate driver 105. The sequencing logic 150 may be coupled at a first output and at a second output to the gate driver 105. The voltage regulator 110 may additionally be coupled to the gate driver 105 and coupled (or operable to couple, for example, via a pin or connection) to a voltage supply. The gate driver 105 may be coupled, or operable to couple, at an output to the hybrid boost converter. In some embodiments, either or both of the AND gate 115 and/or the AND gate 145 may be replaced by any logic structure (analog, digital, or a combination thereof) comprising any one or more components suitable for performing logical operations.

The comparator 130 may be operable to receive a feedback signal (illustrated as Vfb) that may be at least partially based on an output of the hybrid boost converter, as well as a reference voltage (illustrated as Vref). The reference voltage may have a value that corresponds to (e.g., is approximately equal to) an expected value of the reference voltage for a desired output of the hybrid boost converter. For example, the reference voltage may have a value that corresponds to an expected feedback signal for an output by the hybrid boost converter of 200 volts when the hybrid boost converter is configured to provide a 200 volt output signal. In an embodiment, the feedback signal may be generated based on the output of the hybrid boost converter, for example, using a voltage divider (not shown), an amplifier with an amplification factor of less than one, or any other suitable voltage scaling circuit or process. The reference voltage may be generated within the startup current limiter 100 using any suitable technique or may be received by the startup current limiter 100 from an outside component. In some embodiments, an output of the comparator 130 may also be an indication of whether the hybrid boost converter has completed a power-up phase and is providing precisely, or approximately, a desired and/or intended output signal. For example, when the output of the comparator 130 is a digital logic high signal, the hybrid boost converter may have completed the power-up phase and when the output of the comparator 130 is a digital logic low signal, the hybrid boost converter may not have completed the power-up phase.

The sequencing logic 150 may be operable to receive the output of the comparator 130 and detect and latch a digital logic high value of the output of the comparator 130 into the sequencing logic 150 (e.g., into a register or other storage element of the sequencing logic 150). For example, when the output of the comparator 130 is a digital logic high signal, the hybrid boost converter may have completed the power-up phase. The sequencing logic 150 may detect this digital logic high output and latch it into a storage cell (not shown) of the sequencing logic 150. The sequencing logic 150 may subsequently output the value stored in the storage cell as a power good signal (illustrated as Power_Up_Done) that may be utilized by one or more other components of the startup current limiter 100, or components external to the startup current limiter 100, as an indication of whether the hybrid boost converter has completed the power-up phase and is providing a desired and/or intended output signal. The sequencing logic 150 may be further operable to transmit a startup current limiting signal to the gate driver 105 that may instruct the gate driver 105 to perform startup current limiting according to the present disclosure. The sequencing logic 150 may transmit that startup current limiting signal, for example, in response to an output of the comparator 130 being a digital logic low signal that may indicate that the hybrid boost converter has not completed the power-up phase. The sequencing logic 150 may transmit the startup current limiting signal, for example, to control operation of at least a portion of the gate driver 105.

The comparator 135 may be operable to receive a switch current signal (illustrated as Isw) that may be determined at least partially based on a current flowing through the switch of the hybrid boost converter and/or estimated based on a voltage present at a terminal of the switch (e.g., such as at a drain terminal of the switch when the switch is a MOSFET). The switch current signal may be received by the comparator 135 as a voltage signal that is representative of the current, for example, resulting from any suitable form of current detection. The comparator 135 may be further operable to receive a reference signal (illustrated as Ilimit) indicating a current limit or maximum desired current to flow through the switch of the hybrid boost converter. Based on the comparison result, a current value of the control signal provided to the switch by the startup current limiter 100 may be controlled and/or limited, for example, at least partially by the gate driver 105.

An output of the comparator 135 may be passed to the on time circuitry 140 and the AND gate 145. The on time circuitry 140 may further receive a power good signal (e.g., from the sequencing logic 150), which is discussed in greater detail below. In an embodiment, during a power-up phase of the hybrid boost converter the on time circuitry 140 may implement a fixed delay in the startup current limiter 100. For example, the on time circuitry 140 may provide an output that is a delayed version of the input received by the on time circuitry 140 from the comparator 135, where the output has been delayed by a fixed amount. The fixed amount may be, for example, a minimum period of time for the switch of the hybrid boost converter to be active during the power-up phase of the hybrid boost converter. The on time circuitry 140 may comprise any suitable components for delaying a signal, for example and without limitation, one or more flip-flops, however a scope of the structure of on time circuitry 140 is not limited herein. The output of the on time circuitry 140 may be passed to the AND gate 145 such that, after the fixed delay, when an output of the comparator 135 is a digital logic high signal, and output of the AND gate 145 is also a digital logic high signal.

In an embodiment, the memory cell 125 may be, for example, a set-reset (SR) latch such as an SR NOR latch. In other embodiments, the memory cell 125 may be any other suitable device for storing and subsequently delivering a data bit. The memory cell 125 may receive data from the comparator 130, for example, via a set terminal of the memory cell 125, and may receive data from the AND gate 145, for example, via a reset terminal of the memory cell 125. Based on the values received at the set terminal and the reset terminal, the memory cell 125 may provide an output for use by other components in the startup current limiter 100. The output may indicate (or be at least partially based on), for example, whether the power-up phase of the hybrid boost converter is completed (e.g., when the memory cell 125 receives a digital logic high signal from the comparator 130) or whether a value of current flowing through the switch of the hybrid boost converter exceeds a predefined limit (e.g., when the memory cell 125 receives a digital logic high signal from the AND gate 145).

In an embodiment, the output of the memory cell 125 is passed to both the off time circuitry 120 and the first input of the AND gate 115. The off time circuitry 120 is operable, in an embodiment, to calculate an off time for the control signal generated by the gate driver 105 and delay the output of the memory cell 125 of the input received from the memory cell 125 by the calculated off time. The off time may be, for example, a period of time that the control signal has a logic level low value. The off time may be proportional to (or at least partially based on), for example, one divided by a difference between the value of the output voltage (illustrated as Vout) of the hybrid boost converter and the value of the input voltage (illustrated as Vin) of the hybrid boost converter. In some embodiments, the above determination of the off time may be a prediction of an off time sufficient to allow an inductor current of an inductor of the hybrid boost converter to decay to approximately zero in a cycle of the hybrid boost converter (e.g., in one period of the switch of the hybrid boost converter being turned on and subsequently turned off). The off time circuitry 120 may comprise any electrical components suitable for performing the above determination and providing an output to the AND gate 115 indicating whether the control signal generated by the gate driver 105 should be off or on according to the above goal of providing sufficient time for the inductor current of the hybrid boost converter to decay to approximately zero. For example and without limitation, the off time circuitry 120 may comprise a flip-flop, a counter, and/or a comparator, however a scope of the structure of the off time circuitry 120 is not limited herein. Based on the outputs of the memory cell 125 and the off time circuitry 120, the AND gate 115 may provide an output to the gate driver 105. The output of the AND gate 115 to the gate driver 105 may indicate, for example, whether the gate driver 105 should generate and provide a logic level high control signal to the switch of the hybrid boost converter or a logic level low control in an embodiment, when both the output of the memory cell 125 is a digital logic "1" and the output of the off time circuitry 120 is a digital logic "1," an output of the AND gate 115 may be a digital logic "1." Otherwise, an output of the AND gate 115 may be a digital logic "0."

Based on the signal received from the AND gate 115 and the power good signal received from the sequencing logic 150, the gate driver 105 generates a control signal and provides the control signal to the switch of the hybrid boost converter to control whether the switch is turned off, turned on partially (so that the switch functions as a current source), or turned on fully (so that the switch functions as a switch). For example, when the signal received from the AND gate 115 is a digital logic low signal, the gate driver 105 may generate the control signal to control the switch of the hybrid boost converter to be turned off. When the power good signal received from the sequencing logic 150 is a digital logic low signal, the gate driver 105 may generate the control signal to control the switch of the hybrid boost converter to be partially on (e.g., such that the switch of the hybrid boost converter functions as a current source). In other cases (e.g., when the signal received from the AND gate 115 is not a digital logic low signal or the power good signal received from the sequencing logic 150 is not a digital logic low signal) the gate driver 105 may generate the control signal to control the switch of the hybrid boost converter to be fully on (e.g., such that the switch of the hybrid boost converter functions as a switch). Construction and operation of one embodiment of the gate driver 105 will be discussed in greater detail below with respect to FIG. 2. The gate driver 105 may additionally receive a regulated voltage signal from the voltage regulator 110. A value of the regulated voltage signal may correspond to a value of the control signal when the gate driver 105 seeks to fully turn on the switch so that it functions as a switch rather than as a current source.

Figure 2:
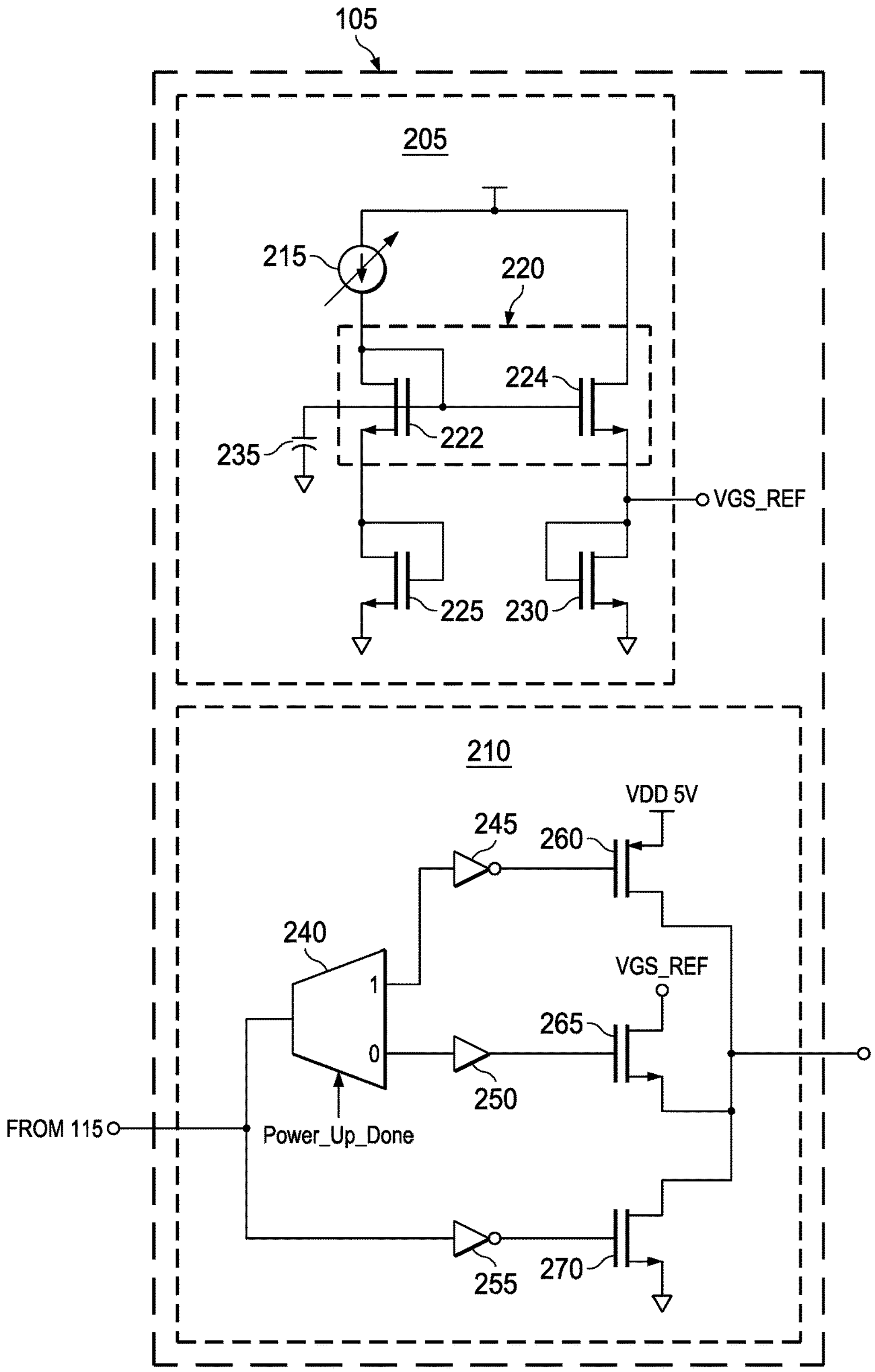
FIG. 2 is a schematic diagram of an illustrative gate driver in accordance with various embodiments.

Referring now to FIG. 2, a schematic diagram of an illustrative gate driver 105 in accordance with various embodiments is shown. The gate driver 105 may be implemented in the startup current limiter 100, as discussed above with respect to FIG. 1. In an embodiment, the gate driver 105 comprises a reference generation circuit 205 and a control circuit 210. The reference generation circuit 205, in an embodiment, comprises an adjustable current source 215, a current mirror 220, a first transistor 225, and a second transistor 230. The first transistor 225, in some embodiments, may be a replica of a transistor implemented as the switch of the hybrid boost converter. For example, the first transistor 225 may have approximately the same electrical characteristics as the transistor implemented as the switch of the hybrid boost converter. As another example, the first transistor 225 may be a scaled replica of the transistor implemented as the switch of the hybrid boost converter that may have, for example, a substantially same finger width and length as the transistor implemented as the switch of the hybrid boost converter. In some embodiments, the first transistor 225 is coupled to a input transistor 222 of the current mirror 220 in a diode-connected transistor configuration and the second transistor 230 is coupled to an output transistor 224 of the current mirror 220 in a diode-connected transistor configuration. In some embodiments, the output transistor 224 of the current mirror 220 may have a size that is scaled based on a size of the input transistor 222 of the current mirror 220. For example, a transistor width of the output transistor 224 of the current mirror 220 may be about four times greater than a transistor width of the input transistor 222 of the current mirror 220. Similarly, the second transistor 230 may have a size that is scaled based on a size of the first transistor 225. In some embodiments, a size ratio between the second transistor 230 and the first transistor 225 and a size ratio between the output transistor 224 of the current mirror 220 and the input transistor 222 of the current mirror 220 may be approximately the same. For example, in an embodiment the second transistor 230 may have a transistor width about four times greater than a transistor width of the first transistor 225. In an embodiment, a compensation capacitor 235 may be coupled to the current mirror 220 (e.g., to a gate terminal of the input transistor 222 of the current mirror 220). In an embodiment, an output (illustrated as Vgs_Ref) of the reference generation circuit 205 may be taken at the output transistor 224 of the current mirror 220 (e.g., at a source terminal of the output transistor 224 of the current mirror 220 and/or at a drain terminal of the second transistor 230).

The adjustable current source 215 may be coupled to voltage supply 212 (e.g., which in some embodiments may be the voltage supply to which the voltage regulator 110 and/or the off time circuitry 120 are coupled and which provides Vin) and may be adjustable by another component or device implemented in the startup current limiter 100 or coupled to the startup current limiter 100. For example, the adjustable current source 215 may be coupled to the sequencing logic 150 and adjustable based on the startup current limiting signal received by the gate driver 105 from the sequencing logic 150. In an embodiment, an amount of current provided by the adjustable current source 215 to the current mirror 220 may be modified based on the startup current limiting signal to control an amount of current flowing into the switch of the hybrid boost converter via the control signal generated by the gate driver 105. Controlling the amount of current flowing into the switch of the hybrid boost converter via the control signal may at least partially provide for a gradual change in the switch from operating as a current source to operating as a switch.

During the power-up phase of the hybrid boost converter (e.g., when a supply voltage is first provided), the adjustable current source 215 may be controlled based on the startup current limiting signal to provide a lowest current of multiple current levels. For example, the adjustable current source 215 may be controlled throughout operation of the hybrid boost converter to provide multiple current levels based on changes in a value of the startup current limiting signal, where the multiple levels range from approximately 25 percent of a peak current threshold of the transistor implemented as the switch of the hybrid boost converter to approximately 200 percent of the peak current threshold of the transistor implemented as the switch of the hybrid boost converter. In an embodiment, steps from one current level to another current level may be in approximately 25 percent increments of the peak current threshold. After a predetermined number of cycles of the hybrid boost converter (e.g., periods of the switch of the hybrid boost converter being turned on and subsequently turned off) the adjustable current source 215 may be controlled to provide a next higher current level of the multiple current levels. When the current level provided by the adjustable current source 215 provides for 100 percent of the peak current threshold, the adjustable current source 215 may maintain that current level until the power good signal is received (e.g., by the adjustable current source 215 and/or by the device adjusting the adjustable current source 215). The power good signal may be, for example, output by the sequencing logic 150, as discussed above with respect to the startup current limiter 100 of FIG. 1, or may be provided by another component or device (such as another comparator within or external to the gate driver 105 or startup current limiter 100). After the power good signal is received, in an embodiment the adjustable current source 215 may be further controlled to provide a next higher current level of the multiple current levels after passage of the predetermined number of cycles until 200 percent of the peak current threshold is reached. In an embodiment, once 200 percent of the peak current threshold is reached, the switch of the hybrid boost converter may be operating fully as a switch and no longer as a current source.

The control circuit 210, in an embodiment, comprises a de-multiplexer 240, an inverter 245, a buffer 250, an inverter 255, and transistors 260, 265, and 270. The transistors 265 and 270 may be, for example, n-type metal oxide semiconductor field effect (NMOS) transistors. The transistor 260 may be, for example, a p-type metal oxide semiconductor field effect (PMOS) transistor. The control circuit 210 may be coupled, at an input of the de-multiplexer 240 and an input of the inverter 255, to an output of the AND gate 115 and a drain terminal of the transistor 260 may couple to an output of the voltage regulator 110, each of which is discussed above with respect to the startup current limiter 100 of FIG. 1. The control circuit 210 may be further coupled at a drain terminal of the transistor 265 to an output of the reference generation circuit 205 (e.g., such as the source terminal of the output transistor 224 to receive Vgs_Ref).

The control circuit 210 may receive an output of the AND gate 115 and, based at least partially on the received output of the AND gate 115, control one of the transistors 260, 265, or 270 to generate a control signal for output by the gate driver 105 to the hybrid boost converter. For example, the de-multiplexer 240 may receive the output of the AND gate 115 as well as the power good signal that may instruct the de-multiplexer 240 to provide the output of the AND gate 115 to a particular one of two outputs of the de-multiplexer 240. For example, when the control startup signal is a logical "0," the de-multiplexer 240 may provide the output of the AND gate 115 to an output of the de-multiplexer 240 that is coupled, by way of the buffer 250, to a gate terminal of the transistor 265. When the control startup signal is a logical "1," the de-multiplexer 240 may provide the output of the AND gate 115 to an output of the de-multiplexer 240 that is coupled, by way of the inverter 245, to a gate terminal of the transistor 260. In an embodiment, the control startup signal may be, for example, based on the output of the comparator 130 (e.g., the power good signal), as discussed above with respect to FIG. 1. In an embodiment, the transistor 270 may substantially always receive an inverse of the output of the AND gate 115 via the inverter 255.

When the transistor 260 receives a signal representative of a digital logic "0" at its gate terminal, the potential between the gate and source terminals may be sufficient to cause the transistor 260 to begin conducting between its drain terminal (which may be coupled to a voltage supply (illustrated as VDD) such as the voltage regulator 110) and source terminal (which may be coupled to the output of the gate driver 105). Conversely, when the transistor 260 receives a signal representative of a digital logic "1" at its gate terminal, the gate-source voltage may be insufficient to cause the transistor 260 to conduct between its drain and source terminals and the transistor 260 may be turned off such that VDD is no longer provided at the output of the control circuit 210. When the transistor 265 receives a signal representative of a digital logic "1" at its gate terminal, the gate-source voltage may be sufficient to cause the transistor 265 to begin conducting between its drain terminal (which may be coupled to an output of the reference generation circuit 205) and its source terminal (which may be coupled to the output of the gate driver 105). Conversely, when the transistor 265 receives a signal representative of a digital logic "0" at its gate terminal, the gate-source voltage may be insufficient to cause the transistor 265 to conduct between its drain and source terminals and the transistor 265 may be turned off such that VGS_REF is no longer provided at the output of the control circuit 210. When the transistor 270 receives a signal representative of a digital logic "1" at its gate terminal, the gate-source voltage may be sufficient to cause the transistor 270 to begin conducting between its drain terminal (which may be coupled to the output of the gate driver 105) and its source terminal (which may be coupled to a ground voltage potential). Conversely, when the transistor 270 receives a signal representative of a digital logic "0" at its gate terminal, the gate-source voltage may be insufficient to cause the transistor 270 to conduct between its drain and source terminals and the transistor 270 may be turned off such that the output of the control circuit 210 is no longer coupled to the ground voltage potential.

In this way, during the power-up phase of the hybrid boost converter to which the gate driver 105 (and correspondingly the startup current limiter 100) may be coupled, the gate driver 105 may provide a control signal generated (during a logic level high portion of the control signal) at least partially by the transistor 265 based on a signal present at the drain terminal of the transistor 265 to the switch of the hybrid boost converter to control startup of the hybrid boost converter. After completion of the power-up phase of the hybrid boost converter, the gate driver 105 may then provide a control signal generated (during a logic level high portion of the control signal) at least partially by the transistor 260 based on a signal present at the drain terminal of the transistor 260 to the switch of the hybrid boost converter to control the switch of the hybrid boost converter during normal operation of the hybrid boost converter. During both the power-up phase of the hybrid boost converter and the normal operation of the hybrid boost converter, the gate driver 105 may provide a control signal generated (during a logic level low portion of the control signal) at least partially by the transistor 270 based on the ground voltage potential present at the source terminal of the transistor 270 to the switch of the hybrid boost converter to control the switch of the hybrid boost converter. In this way, voltage and current values of the control signal provided by the gate driver 105 to the switch of the hybrid boost converter may be controlled to prevent damage to the switch resulting from large inrush currents.

Figure 3:
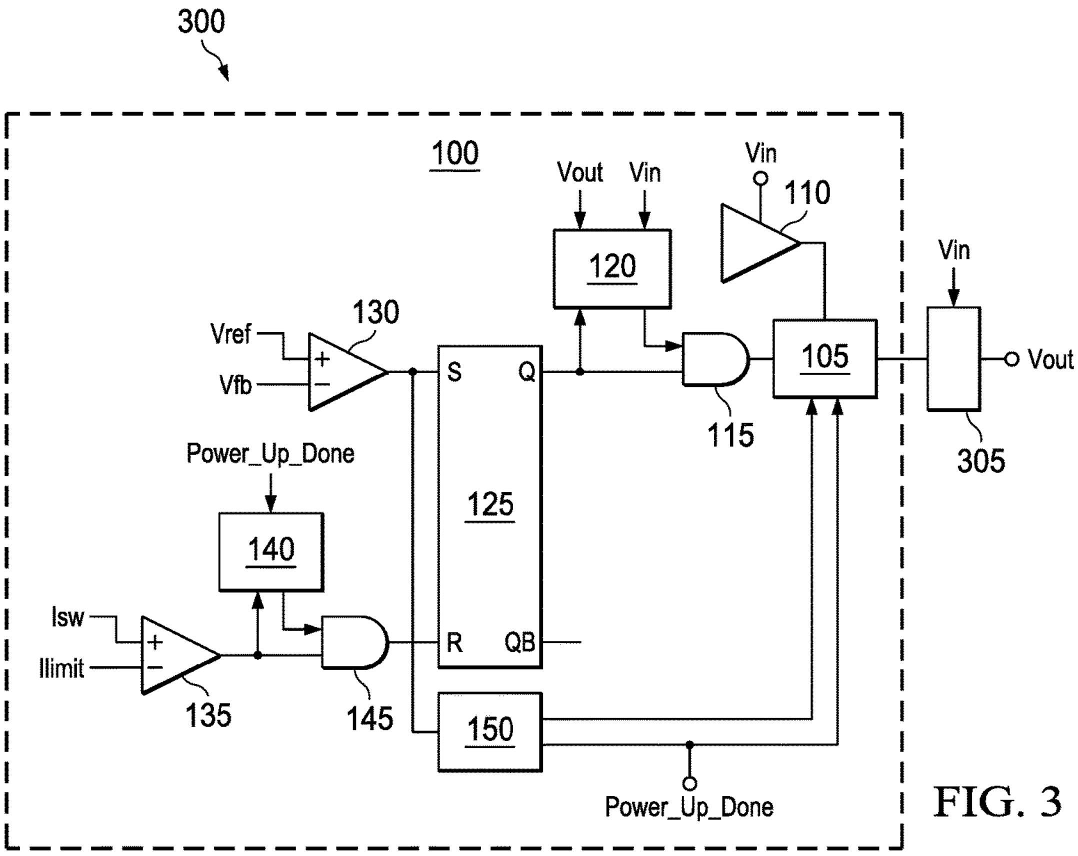
FIG. 3 is a schematic diagram of an illustrative power converter in accordance with various embodiments.

Referring now to FIG. 3, a schematic diagram of an illustrative power converter 300 in accordance with various embodiments is shown. In an embodiment, the power converter 300 comprises a power stage 305 coupled to the startup current limiter 100, discussed with respect to FIG. 1, a description of which is not repeated herein. In an embodiment, the power stage 305 may be, for example, a hybrid boost converter. The power converter 300 may be implemented as a single device (e.g., implemented on a single substrate, enclosed within a single chip package, etc.) or it may be implemented as separate devices that are coupled together (e.g., on multiple substrates, enclosed in multiple chip packages, etc.). The startup current limiter 100 and the power stage 305 may be coupled together using wires, metal traces on a printed circuit board, metal routing on a silicon substrate, or any other suitable form of conductive coupling. In an embodiment, the power converter 300 may be implemented, for example, to provide an output voltage that may be greater in value than an input voltage received by the power converter 300.

The startup current limiter 100 may be constructed and operate substantially as described above with respect to FIGS. 1 and 2. For example, the startup current limiter 100 may be coupled to a switch (not shown), such as a MOSFET transistor implemented as a switch, of the power stage 305 and configured to turn the switch on and off to operate the power stage 305. The startup current limiter 100 may control the switch via a generated control signal to control inrush currents flowing into the switch during a power-up phase of the power stage 305. For example, the startup current limiter 100 may control a voltage value and/or a current value of the control signal, as described above, during the power-up phase of the power stage 305 to manage and/or prevent the inrush currents to the switch of the power stage 305. In this way, damage to the power converter 300 (e.g., metal traces or couplings of the power converter 300) and the power stage 305 (e.g., metal traces or couplings of the power stage 305 and/or the switch of the power stage 305) may be at least partially mitigated.

Figure 4:
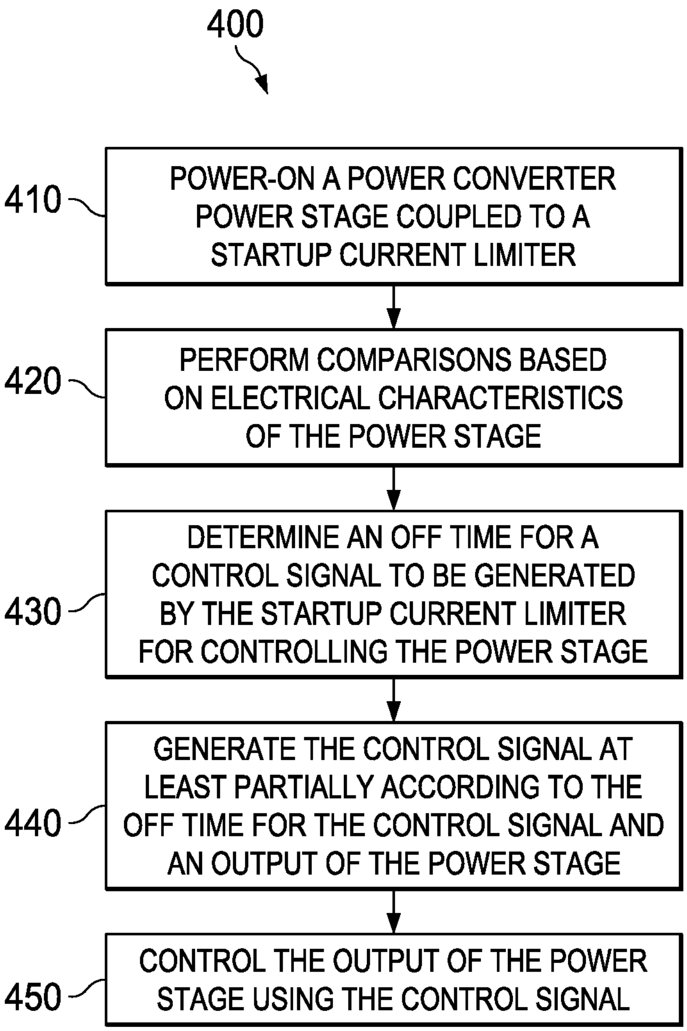
FIG. 4 is a flowchart of an illustrative method of power converter startup current limiting in accordance with various embodiments.

Referring now to FIG. 4, a flowchart of an illustrative method 400 of limiting power converter startup current in accordance with various embodiments is shown. The method 400 may be performed by a startup current limiter, such as the startup current limiter 100, discussed above with respect to FIG. 1, to manage and/or prevent the inrush currents to a switch of a power stage (e.g., during a power-up phase of the power stage) of a power converter or other electronic device.

At operation 410, a power converter power stage to which the startup current limiter is coupled is powered on. The power stage may be powered on, for example, by providing a source voltage to the power stage. Upon being powered on, the power stage may enter a power-up phase for a period of time (e.g., such as a period of time between the power stage being powered on and the power stage providing a desired or intended output of the power stage).

At operation 420, comparisons are performed based on electrical characteristics of the power stage. The comparisons may be, for example, a comparison of a value of a signal representative of an output of the power stage to a reference voltage and/or a comparison of a value of a signal representative of current (or estimated current) flowing into a switch of the power stage to a value of a signal representative of a maximum desired current a limit or threshold) flowing into the switch of the power stage. The comparisons may be performed, for example, by the comparators 130 and 135, respectively, as discussed above with respect to FIG. 1.

At operation 430, an off time for a control signal to be generated by the startup current limiter for controlling the power stage may be determined. The off time may be determined, for example, based at least partially on a value of an input voltage of the power stage and a value of an output voltage of the power stage. The off time may be determined, for example, to be sufficiently long to allow discharging of one or more components (e.g., decay of inductor currents of one or more inductors) to approximately zero. The off time may be determined, for example, by the off time circuitry 120, as discussed above with respect to FIG. 1.

At operation 440, a control signal is generated at least partially according to the off time determined at operation 430 and an output of the power stage. The control signal may be generated, for example, by the gate driver 105, as discussed above with respect to FIGS. 1 and 2. A value of the control signal may be controlled such that a voltage and/or a current of the control signal may begin at a comparatively low level and slowly increase to a desired level during the power-up phase of the power stage. For example, the value of the control signal may be determined at least partially according to any one or more of the off-time determined at operation 430, a reference signal determined according to a desired current to be provided to a switch of the power stage during the power-up phase of the power stage, an output voltage of the power stage, and/or a current (or estimated current) at the switch of the power stage.

At operation 450, the control signal is provided to the power stage to control the switch of the power stage. The control signal may be provided, for example, by a gate driver to a transistor switch of the power stage. In an embodiment, the control signal may control the transistor switch of the power stage to operate as a current source during the power-up phase of the power stage and as a switch subsequent to the power-up phase of the power stage.

While the operations of the method 400 have been discussed and labeled with numerical reference, the method 400 may include additional operations that are not recited herein. In addition, any one or more of the operations recited herein may include one or more sub-operations, any one or more of the operations recited herein may be omitted, and/or any one or more of the operations recited herein may be performed in an order other than that presented herein (e.g., in a reverse order, substantially simultaneously, overlapping, etc.), all of which are intended to fall within the scope of the present disclosure.

In the foregoing discussion and in the claims, the terms “including” and “comprising” are used in an open-ended fashion, and thus should be interpreted to mean “including, but not limited to . . . .” Also, the term “couple” or “couples” is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. Additionally, uses of the phrase “ground voltage potential” in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, “about”, “approximately”, or “substantially” preceding a value means+/−10 percent of a stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A startup current limiter, comprising:
- a first comparator;
- a second comparator;
- on time circuitry coupled to an output of the second comparator;
- a first logic structure coupled to the output of the second comparator and an output of the on time circuitry;
- sequencing logic coupled to an output of the first comparator;
- a latch coupled to an output of the first comparator at a set terminal of the latch and an output of the second comparator at a reset terminal of the latch;
- off time circuitry coupled to an output terminal of the latch;
- a second logic structure coupled to the latch and the off time circuitry; and
- a gate driver coupled to the second logic structure and an output of the sequencing logic.

2. The startup current limiter of claim 1, wherein the gate driver comprises:
- a reference generation circuit, comprising:
  - a current mirror;
  - an adjustable current source coupled to an input transistor of the current mirror;
  - a first diode-connected transistor coupled to the input transistor of the current mirror; and
  - a second diode-connected transistor coupled to an output transistor of the current mirror; and
- a control circuit, comprising:
  - a de-multiplexer coupled at an input to the output of the second logic structure and at a control input to the output of the sequencing logic;
  - a first inverter coupled to a first output of the de-multiplexer;
  - a buffer coupled to a second output of the de-multiplexer;

a second inverter coupled to an input of the control circuit;

a first transistor having a first gate terminal coupled to an output of the first inverter;

a second transistor having a second gate terminal coupled to an output of the buffer; and a third transistor having a third gate terminal coupled to an output of the second inverter, wherein a source terminal of the first transistor, a source terminal of the second transistor, and a drain terminal of the third transistor are coupled to an output of the control circuit.

3. The startup current limiter of claim 2, further comprising a voltage regulator coupled to an input of the gate driver.

4. The startup current limiter of claim 3, wherein a drain terminal of the first transistor is coupled to an output of the voltage regulator, wherein a drain terminal of the second transistor is coupled to the output transistor of the current mirror, and wherein a source terminal of the third transistor is coupled to a ground voltage potential.

5. The startup current limiter of claim 2, wherein the output of the control circuit is coupled to and operable to control a switch of a power stage of a power converter.

6. The startup current limiter of claim 1, wherein the startup current limiter is operable to couple to a power stage of a power converter to control a switch of a power stage of a power converter.

7. The startup current limiter of claim 6, wherein the first comparator is operable to receive a first signal based at least partially on an output voltage of the power stage and a reference signal and to output a first comparison result to the latch, and wherein the second comparator is operable to receive a second signal indicative of a current flowing through the switch of the power stage and a current limit signal and to output a second comparison result to the latch.

8. The startup current limiter of claim 6, wherein the off time circuitry is operable to determine a length of an off time for the switch based at least partially on an input voltage of the power stage and an output voltage of the power stage.

9. The startup current limiter of claim 8, wherein the gate driver is operable to:

generate a control signal to control the switch based at least partially on an output of the second logic structure and the first comparator; and control a voltage value and a current value of the control signal to control a value of an inrush current of the switch.

10. An apparatus, comprising:

a power stage operable to receive an input signal at a first voltage value and output an output signal at a second voltage value greater than the first voltage value; and a startup current limiter coupled to the power stage, comprising:

a first comparator;

a second comparator;

on time circuitry coupled to an output of the second comparator;

a first logic structure coupled to the output of the second comparator and an output of the on time circuitry;

sequencing logic coupled to an output of the first comparator;

a latch coupled to an output of the first comparator at a set terminal of the latch and an output of the first logic structure at a reset terminal of the latch;

off time circuitry coupled to an output terminal of the latch;

a second logic structure coupled to the latch and the off time circuitry; and a gate driver coupled the power stage and comprising:

a reference generation circuit, comprising:

a current mirror;

an adjustable current source coupled to an input transistor of the current mirror;

a first diode-connected transistor coupled to the input transistor of the current mirror; and a second diode-connected transistor coupled to an output transistor of the current mirror; and a control circuit, comprising:

a de-multiplexer having a first input coupled to an output of the second logic structure and a second input coupled to an output of the sequencing logic;

a first inverter coupled to a first output of the de-multiplexer;

a buffer coupled to a second output of the de-multiplexer;

a second inverter coupled to an input of the control circuit;

a first transistor having a first gate terminal coupled to an output of the first inverter;

a second transistor having a second gate terminal coupled to an output of the buffer; and a third transistor having a third gate terminal coupled to an output of the second inverter.

11. The apparatus of claim 10, wherein the power stage comprises a switch, and wherein a source terminal of the first transistor, a source terminal of the second transistor, and a drain terminal of the third transistor are coupled to an input of the switch.

12. The apparatus of claim 11, wherein the first comparator is operable to receive a first signal based at least partially on an output voltage of the power stage and a reference signal and output a first comparison result to the latch, and wherein the second comparator is operable to receive a second signal indicative of a current flowing through the switch of the power stage and a current limit signal and output a second comparison result to the latch.

13. The apparatus of claim 11, wherein the off time circuitry is operable to determine a length of an off time for the switch based at least partially on an input voltage of the power stage and an output voltage of the power stage.

14. The apparatus of claim 10, wherein the startup current limiter further comprises a voltage regulator, wherein a drain terminal of the first transistor is coupled to an output of the voltage regulator, wherein a drain terminal of the second transistor is coupled to the output transistor of the current mirror, and wherein a source terminal of the third transistor is coupled to a ground voltage potential.

15. The apparatus of claim 10, wherein the adjustable current source is operable to adjust a current output of the current mirror to control a current value of an output of the reference generation circuit.

16. The apparatus of claim 10, wherein the control circuit is operable to generate a control signal having a value determined at least partially according to an output of the off time circuitry, an output of the first comparator, and an output of the reference generation circuit.

* * * * *